United States Patent [19]

Howard et al.

[11] Patent Number: 5,139,277
[45] Date of Patent: Aug. 18, 1992

[54] RAPIDLY CONVERTIBLE CHUCK ADAPTERS

[76] Inventors: Carl J. Howard, 8226 Hency Rd., Kingsley, Mich. 49649; Donald J. Wrobel, 7973 Shoreside Dr., Traverse City, Mich. 49684

[21] Appl. No.: 653,019

[22] Filed: Feb. 8, 1991

Related U.S. Application Data

[63] Continuation-in-part of Ser. No. 652,125, Feb. 7, 1991.

[51] Int. Cl.$^5$ .................... B23B 31/177; B23B 31/16
[52] U.S. Cl. .................... 279/124; 279/125; 279/147; 279/148; 279/901
[58] Field of Search ............... 279/1 ME, 110, 121, 279/123, 124, 125, 152, 153, 147, 148, 901

[56] References Cited

U.S. PATENT DOCUMENTS

| | | | |
|---|---|---|---|
| 3,606,364 | 9/1971 | Benjamin et al. | 279/110 X |
| 4,243,236 | 1/1981 | Röhm | 279/110 |
| 4,243,237 | 1/1981 | Röhm | 279/110 X |
| 4,270,763 | 6/1981 | Röhm | 279/110 X |
| 4,969,654 | 11/1990 | Theodolin | 279/110 X |

FOREIGN PATENT DOCUMENTS 3437505 5/1985 Fed. Rep. of Germany ...... 279/110

Primary Examiner—Steven C. Bishop
Attorney, Agent, or Firm—Price, Heneveld, Cooper, DeWitt & Litton

[57] ABSTRACT

A chuck having a sliding outer jaw is locked against any adjustment in radial position relative to the inner jaw on which it is moved radially by a radially movable pin which, in one radial position, prevents axial retraction of the post interconnecting inner and outer jaws for radial movement. The chuck utilizes a tool having a pair of radially movable means, one of which is capable of moving the post axially of the chuck after the other means has caused the post retention to be made inactive for preventing axial movement of the post.

14 Claims, 3 Drawing Sheets

RAPIDLY CONVERTIBLE CHUCK ADAPTERS

This application is a continuation-in-part of U.S. patent application Ser. No. 652,125 entitled RAPID CHANGE WEDGE CHUCK WITH POSITIVE LOCK, filed Feb. 7, 1991.

SUMMARY OF THE INVENTION

The chuck of this invention has workpiece holding jaws mounted on jaw supports which have very limited radial movement between clamp and release positions. However, by means of adjustment of the jaws' interengagement with the means by which they are radially positioned, the size of the workpiece with which the chuck can be used can be changed. A change from one workpiece size range to another can be accomplished quickly and without specialized tools.

BACKGROUND OF THE INVENTION

This invention relates to chucks for machine tools designed either for high-speed operation or machining operations in which the chuck must sustain severe lateral forces due to the machining pressures exerted on the workpiece. In either case, it is essential that the workpiece be positively held and that the grip on the workpiece is capable of positively resisting any forces, such as centrifugal forces, which would tend to cause it to loosen its grip on the workpiece. This latter requirement has become much more urgent and meaningful as both the operating speed and the pressure exerted by the tools on the workpieces have been increased.

The problem has been to satisfy the need for better and more positive engagement with the workpiece without materially increasing the cost of the chuck, limiting its utility or complicating its set-up procedure.

Heretofore chucks designed for the service conditions to which this invention is designed to be applied have been limited to a very small jaw movement capability. As a result, the chucks are highly specialized and have limited use and are not adaptable &:o use with workpieces of any significant range of dimensional difference without a long and complicated rework adjustment of the chuck. Since such chuck adaptation work must be done by skilled personnel, the cost of adaptation of the chuck from one job to another has been prohibitive unless the length of the run on which the chuck is to be used is of sufficient size that the cost of adaptation can be absorbed.

This invention overcomes this difficulty by providing means different from those described and claimed in the application above identified by which such chucks can be quickly adapted to serve a much wider range of workpiece sizes with a minimum downtime requirement without the necessity for use of highly skilled labor to perform the changeover. Like the invention described in our co-pending application, the changeover can be accomplished so rapidly that there is no reason to attempt to use the machine on which the chuck has been mounted for any other purpose while the changeover is being made. Further, this permits the chuck to be used for a much wider range of work and thus for a much higher proportion of its availability. This materially expands the basis upon which the capital investment in the chuck can be amortized and also reduces the number of chucks which a machine shop has to keep in inventory in order to have a reasonable spectrum of capability. The invention also materially reduces the amount of machine tool downtime necessary for changeover from one machining job to another. For smaller machine shops, it significantly increases the scope and range of the jobs the machine shop can profitably perform with each of its chucks. Thus, the chuck's return on capital is materially increased and the requirements of storage space for idle chucks is significantly reduced.

Another aspect of this invention is its use with chucks having so-called soft jaws, that is, chucks having jaws of unhardened steel. These are desirable for many machining operations. This invention permits such jaws to have a much longer service life before major reconditioning since the wear on the jaws can be compensated simply by adjusting the outer jaws' position with respect to the inner jaw by means which are quick and simple to use.

A further aspect to this invention is that it provides a positive means of preventing the chuck changeover being considered complete without the outer jaw being positively locked to the inner jaw. Failure to lock the jaws together can result in serious injury to personnel and the equipment. This invention provides positive physical evidence that this step has not been completed. It prevents the tool used both to release and to secure the outer jaw from being removed from the chuck unless the outer jaw has been properly secured.

DESCRIPTION OF THE PREFERRED EMBODIMENT

Figure 1:
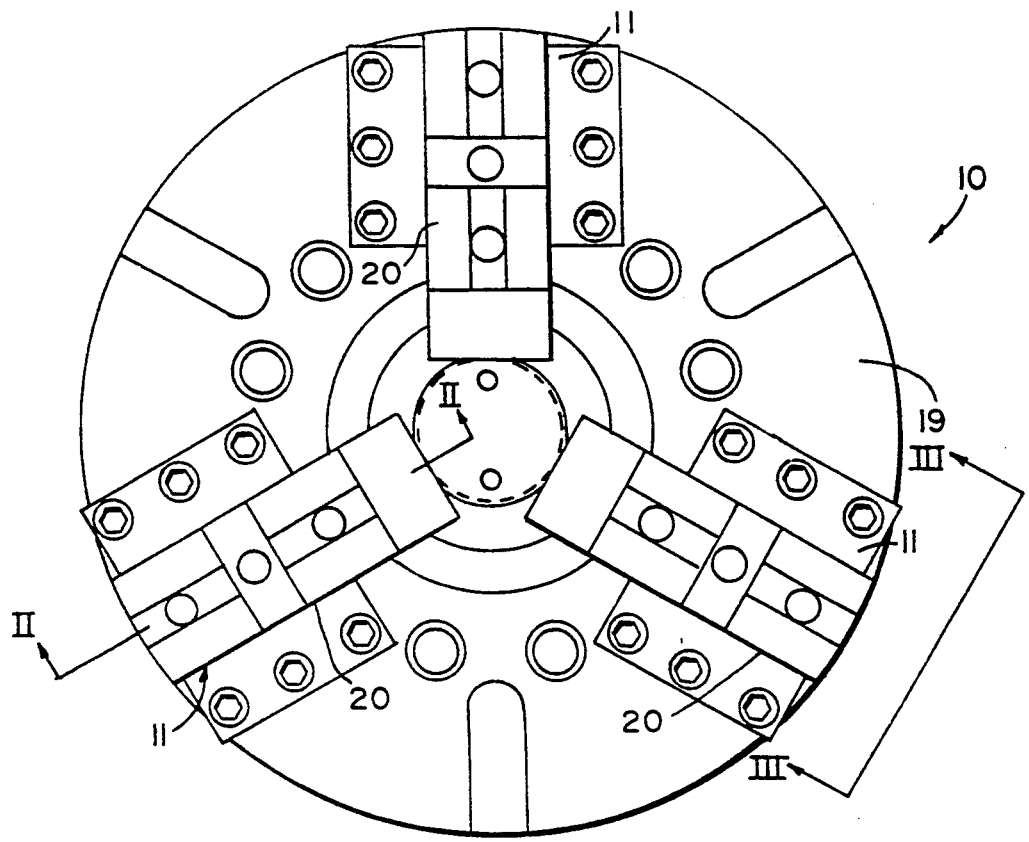
FIG. 1 is a front face view of a three-jaw chuck of the type to which this invention can be applied.
Figure 3:
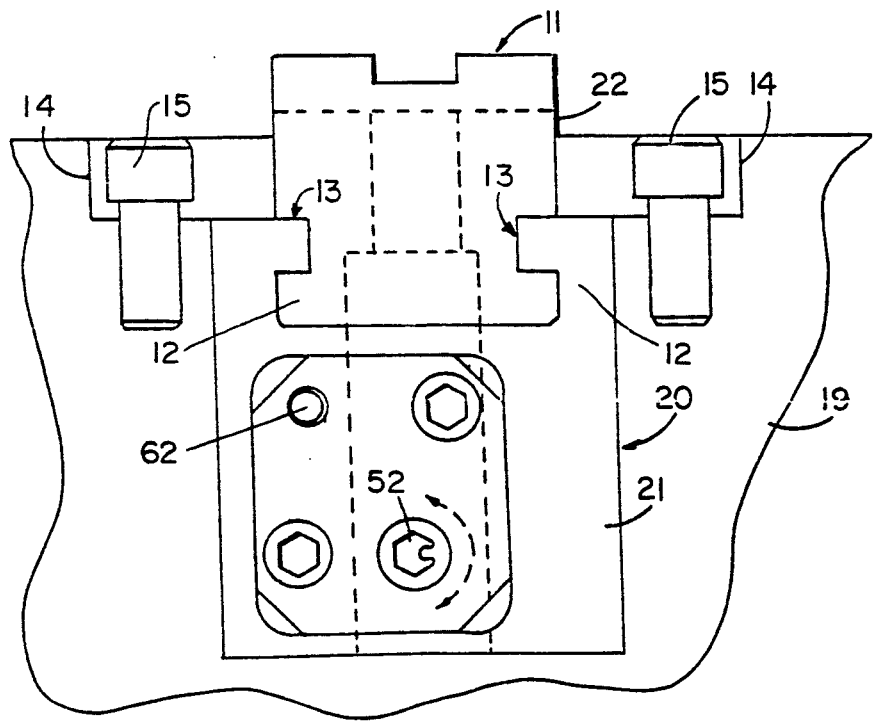
FIG. 3 is an enlarged, fragmentary elevational view taken along the plane III—III of FIG. 1.
Figure 2:
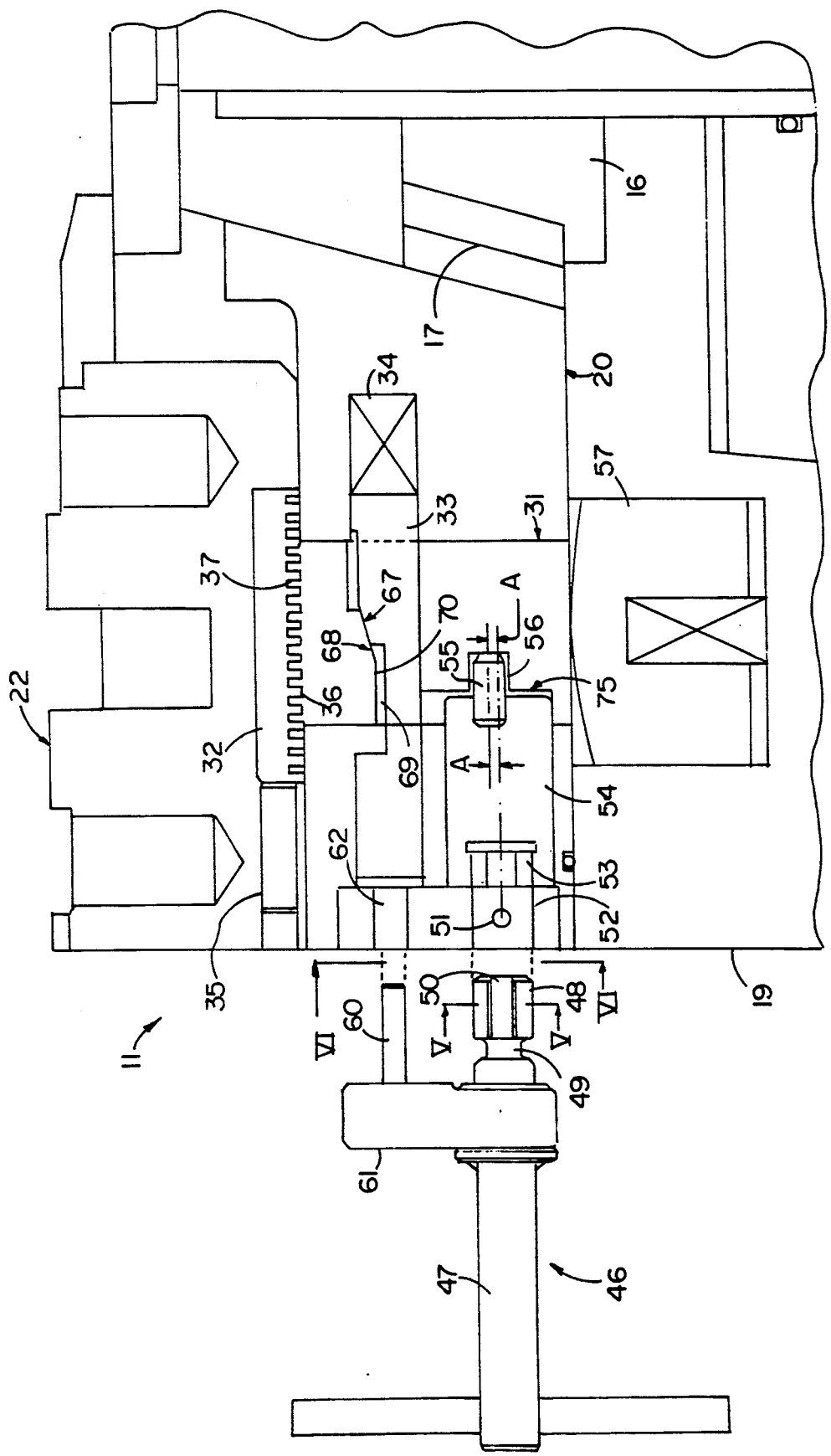
FIG. 2 is an enlarged sectional elevation view of one of the jaws taken along the plane II—II of FIG. 1 illustrating the jaws in locked condition with cross sectioning omitted for clarity.

Referring specifically to FIGS. 1 and 3, a typical chuck 10 is illustrated, having mounted thereon three jaws 11 which are radially slidable in the chuck body 19. The chuck body has radially extending jaw receiving openings 20 each slidably seating one of the jaws 11. Each jaw has an inner member 21 and an outer member 22. The outer member provides a base on which the fingers which actually grip the workpiece are mounted. The outer member is slidably seated between a pair of rails 12 which seat in the radially extending slots 13 of the outer member 22 (FIG. 3). The jaws 11 are further guided by the side members 14 which are recessed into the outer face of the chuck and held by the cap screws 15. The chuck, as illustrated, has three of these jaws 11 which is a conventional arrangement but, for the purpose of this invention, the chuck can have additional jaws as may be considered necessary. The actual work gripping fingers, which engage the part to be machined, are not illustrated since they are conventional and will be adapted to the shape of the particular part to be machined. The jaws 11 are designed to move radially a short distance for the purpose causing the gripping fingers to either engage or release the workpiece to be machined. This movement is effected by axial movement of the jaw actuator 16 which engages the inclined slide 17 at the radially inner end of the jaw (FIG. 2). This type of jaw actuation is not described in detail since it is conventional and, while this invention cooperates with it, it is not part of the invention.

Figure 4:
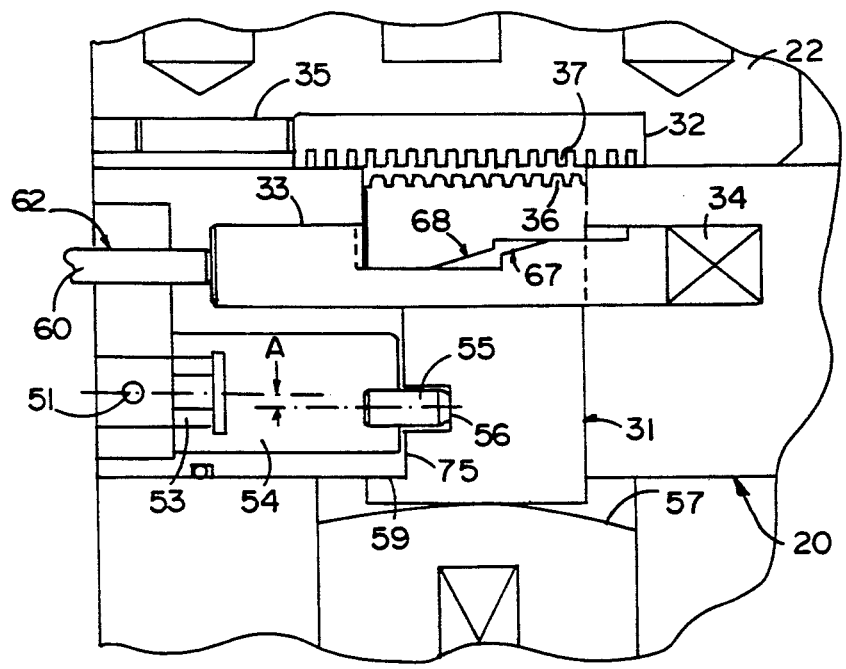
FIG. 4 is a fragmentary, sectional elevation view taken along the same plane as FIG. 2, illustrating the jaws in unlocked condition.

Each of the outer jaw member 22 has a recess 30 in its inner face (FIG. 2). Seated in the recess 30 is a jaw jaw positioner or indexing plate 32. The jaw positioner is an indexing means which fits closely between the sides of the recess and abuts against the radially inner end 34 of the recess. It is firmly pressed into this position by the set screw 35. As the jaw moves radially inwardly it transports with it the post 31 and the jaw positioner or indexing plate 32 which is seated in the recess 30 and engages and interfits with the upper end of the post 31 when the post is in its extended position, as illustrated in FIG. 2. The post 31 is held against rotation about its central axis by the jaw lock bar 33 which is urged into locking position by the spring 34 (FIGS. 2, and 4). Rotation of the post is also prevented by abutment of the flat inner end of the actuator 54 with the flattened area of the recess 75 in the face of the post.

The end of the post 31 facing the outer jaw is provided with teeth 36 of a size and shape to seat in and firmly engage the mating teeth 37 on the back face of the positioner or indexing plate 32 seated in the recess 30. The teeth on the end of the post 31 and those on the indexing plate 32 are designed to have a positive interfit without play to assure positioning of the jaw which will not loosen during use of the chuck even under high centrifugal speeds and high tool pressure.

Figure 7:
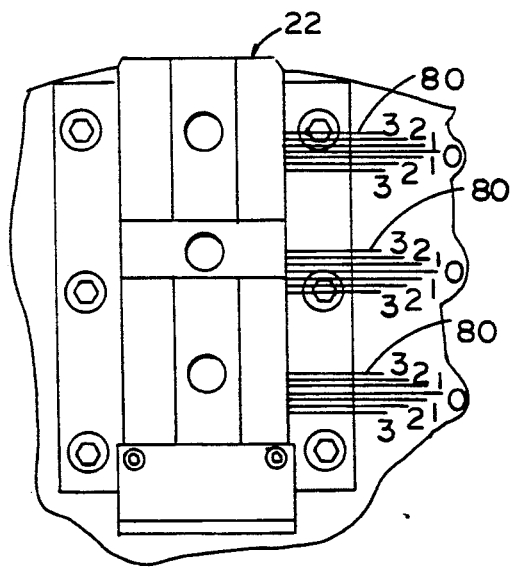
FIG. 7 illustrates a typical face of the chuck provided with incremental markings for different ranges of part sizes.

FIG. 7 illustrates the fact that the invention permits the jaws 11 to have at least three different radial positions in each of which positions it has a limited range of radial adjustment. Thus, the chuck cannot be used for machining parts which are outside the range of the position the jaws are in unless the outer jaw's position relative to its inner jaw is relocated to a new and different radial position. Each of these ranges is indicated by one of the sets of indicia markings 80 on the face of the chuck.

This shift from one part size range to another is accomplished by repositioning each jaw radially with respect to the post 31. To do this, tool 46 is used (FIG. 2). This tool is designed to enter the opening 52 and seat in the hexagonal socket 53 in the actuator 54 (FIG. 2). The tool 46 has a primary shaft 47 with a hexagonal head 48 separated from the shaft by a circular channel 49 of reduced diameter. To enter the opening 52, the head 48 has an axially extending slot 50 (FIGS. 2 and 6) permitting it to pass by the pin 51 in the opening 52 leading to the hexagonal socket 53 in the actuator 54 for the post. The end of the actuator 54 remote from the socket 53 has a pin 55 which seats in a transverse slot 56 in the post 31. The flat inner end of the actuator extends into the recess 59 and abuts the inner face of the recess and thus also holds the post against rotation. The pin 55 is offset radially from the central axis of the actuator as indicated by the letter "A". Thus, when the actuator 54 is rotated, the pin 55 causes the post 31 to be moved axially. Thus, as the tool 46 is turned it generates a force which urges the post to disengage the teeth 37 of the indexing plate 34 and compresses the spring 57 which urges the post into engagement with the plate (FIG. 4).

Figure 6:
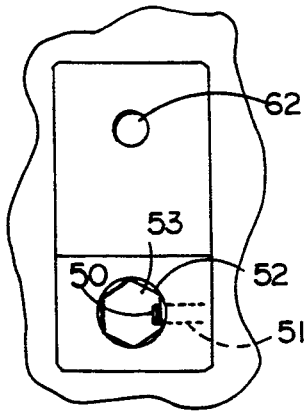
FIG. 6 is a fragmentary sectional view taken along the plane VI—VI of FIG. 2.
Figure 5:
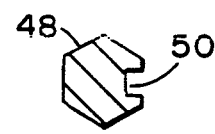
FIG. 5 is a sectional view taken along the plane V—V of FIG. 2.

However, the post 31 cannot be retracted until the means which locks the post into engagement with the indexing plate 32 has been released. This is accomplished by the plunger 60 on the arm 61 which arm is rotatably mounted on the shaft of the tool. To effect a release of the post 31, permitting it to be retracted, the plunger 60 must be inserted in the opening 62 (FIGS. 2, 4 and 6). Thus, to initiate release of the outer jaw 22 from the post 31, the head 48 on the tool's primary shaft must be turned to align the slot 50 with the pin 51 and the plunger 60 aligned with and inserted into the opening 62. The tool can then be moved to fully insert both the actuator 54 and the plunger 60. However, to effect retraction of the post 31, the tool 46 must be rotated. This cannot be done unless the tool is fully inserted to align the circular channel 49 in the tool with the pin 51. The initial rotational movement of the tool will immediately result in misalignment of the pin 51 with the slot 50 preventing removal of the tool until the slot 48 has been returned once again to the circumferential position at which it was inserted. The importance of this is that it provides positive visual evidence that the outer jaw may not be properly anchored by the post because only when the pin 51 is circumferentially aligned with the slot 48 can the tool be withdrawn. This alignment cannot occur unless the teeth of the post and outer jaw are engaged. This avoids a possible tragic oversight.

In its extended or locked position, a camming surface 67 on jaw lock bar 33 seats against a mating cam surface 68 on the post 31 locking the teeth 36 on the post 31 firmly in engagement with the teeth 37 on the outer jaw member 22 (FIG. 2). Once the tool has been fully inserted, it is released for rotation and can then be turned enough to cause the eccentric pin 55 to withdraw the post, releasing the outer jaw member for radial relocation. The inward movement of the jaw lock bar 33 against the spring 34 brings the recess 69 in the jaw lock bar into alignment with the flange 70 on the post 31. This permits the index plate to retract sufficiently to disengage the teeth 36 on the post from the teeth 37 of the index plate. This releases the outer jaw for adjustment of its axial position with respect to the post 31 (FIG. 4).

It will be noted from the preceding description that neither of the elements of the chuck body which control the position of the post 31 project beyond the exterior surface of the chuck. This coupled with the pin 51, makes it necessary to utilize the specialized tool 46 to effect release of the outer jaw. This is a further safeguard against inadvertent failure to have the outer jaw positively locked to the inner jaw whenever the chuck is to be operated.

FIG. 7 illustrates how suitable indicia can be provided on the face of the chuck indicating at which of the several radial positions the outer jaw is secured to the inner jaw. It will also be recognized from this drawing that the jaw is larger than that illustrated in the other figures of this disclosure and that this invention is not limited to a chuck of a certain diameter and can be used with chucks having a greater or a lesser range of adjustment.

Figure 8:
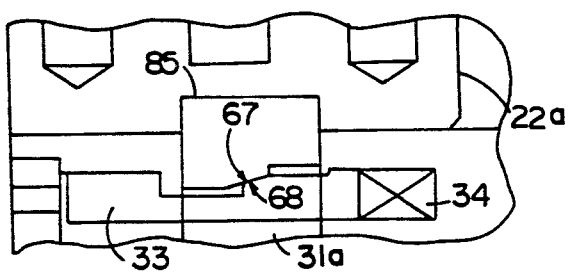
FIG. 8 is a fragmentary sectional view of a modified engagement between the post and the outer jaw.

FIG. 8 illustrates a modified approach to increasing the range of utility of precision chucks having a very limited range of jaw movements. In this case, the outer jaw 22a has a recess 85 in its inner face of a size to closely seat around the head of the post 31a. The post 31a is locked into jaw engaging position by the same mechanism as illustrated in FIGS. 2 and 4 including ramp 68, camming surface 67 on the lock bar 33 and the mating cam surface 68 which can be released by pressing the jaw lock bar 33 inwardly against the spring 34. This construction permits quick and simple replacement of the outer jaw to accommodate workpieces of various sizes. Using this construction replacement, the outer jaws can be equipped with work gripping members capable of holding a workpiece of a different size and the chuck changed from one size workpiece to another simply by substitution of the outer jaws 22a with other outer jaws 22a which have already been prepared to hold the new workpiece. Using this invention, this changeover can be completed quickly and without the need for highly specialized tool personnel.

Having described a preferred embodiment of our invention, it will be recognized that various modifications of the invention can be made without departing from the principles of the invention, such modifications are to be included in the hereinafter appended claims unless these claims, by their language, expressly state otherwise.

We claim:

1. In a chuck having a body equipped with a plurality of outer jaws mounted for sliding radial movement, a post behind each of said outer jaws, supported in said body for axial movement only, interengagable means on both the post and the adjacent jaw securing the outer jaw to the post against any radial movement relative to the post, radially movable locking means for securing said post against movement releasing said outer jaw, means rotatable about a radial axis having an element engaging said post for moving the post axially when said rotatable means is rotated, and actuator means, insertable radially into said chuck body, having a member for engaging and moving said radially movable locking means into a post release position, whereby said member has displaced said radially movable locking means to release said post for axial movement, rotation of said rotatable means can retract said post to release said outer jaw for radial repositioning.

2. In a chuck having a body equipped with a plurality of outer jaws as described in claim 1, wherein both said rotatable means and said actuator means are moved radially into said body for shifting said radially movable locking means into said post release position and engaging said rotatable means to said post.

3. In a chuck having a body equipped with a plurality of outer jaws as described in claim 2, wherein said rotatable means and said actuator means are mounted on a tool, with said rotatable means being rotatable with respect to said actuator means.

4. In a chuck having a body equipped with a plurality of outer jaws as described in claim 3, wherein stop means are provided on said chuck to prevent rotation of said rotatable means until both said rotatable means and said actuator are fully inserted into said chuck body.

5. In a chuck having a body equipped with a plurality of outer jaws as described in claim 4, wherein said actuator means has a length such that it effects release of the radially movable locking means before said rotatable means is released by said stop means.

6. In a chuck having a body equipped with a plurality of outer jaws as described in claim 1, wherein said body has a radial opening of a cross-sectional size only large enough for said rotatable means to pass through, said opening having a spline projecting radially thereinto, and said rotatable means having an axial keyway just large enough to allow said spline to pass axially therethrough, said rotatable means having a circular channel to receive said spline and permit said rotatable means to be rotated only when said rotatable means is fully inserted and engaged with said post.

7. In a chuck having a body equipped with a plurality of outer jaws mounted therein for sliding radial movement, a post supported in said body for axial movement behind each of said outer jaws, interengaging means on both the post and the outer jaw securing the outer jaw against any radial movement relative to the post, radially movable locking means for securing said post against movement releasing said outer jaw, means rotatable about a radial axis having a pin projecting axially from one end eccentrically of the axis of rotation of said rotatable means, said pin engaging said post for moving it axially when said rotatable means is rotated, and actuator means, insertable radially into said chuck body, having a first member for engaging said radially movable locking means and a second member for engaging said rotatable means, whereby when said first member has displaced said radially movable locking means to release said post for axial movement, rotation of said rotatable means retracts said post to release said outer jar for radial repositioning.

8. In a chuck having a body equipped with a plurality of outer jaws mounted for sliding radial movement as described in claim 7, wherein said interengaging means on said outer jaw can engage said post at a plurality of different positions radially of said chuck, each of which is outside a limited radial range of any of the other positions.

9. In a chuck having a body equipped with a plurality of outer jaws mounted for sliding radial movement as described in claim 7, wherein said interengaging means are teeth for transfer of radial loads between said outer jaw and said post, a radial length of a rearward face of said outer jaw having said teeth being greater than a radial length of an end of said post having said teeth, whereby said outer jaw can be radially repositioned.

10. In a chuck having a body equipped with a plurality of outer jaws mounted for sliding radial movement as described in claim 7, wherein an inner face of each of said outer jaws has a recess, a selector key seated in each of said recesses, and means locking said selector key to said outer jaw, said selector key having one element of said interengaging means for engaging the post, whereby movement of said outer jaw radially of the chuck is limited to that which is simultaneous with and identical to that of an inner jaw on which said outer jaw is mounted.

11. In a chuck having a body equipped with a plurality of outer jaws mounted for sliding radial movement as described in claim 8, wherein said radially movable locking means and said post have complementary interengagable camming surfaces, whereby when said radially movable locking means is in one position it cams said post into engagement with said outer jaw, and resilient means bias said locking means into said one position.

12. In a chuck having a body equipped with a plurality of jaws mounted therein for sliding radial movement, each jaw having an inner member and an outer member, each jaw having identical means for controlling jaw movement, said means comprising: a post mounted in said body for reciprocal axial movement between a extended jaw engaging and holding position and a retracted jaw release position, radially movable means, intersecting said post, having thereon an element which, in one position of said radially movable means, engages said post and holds it against retraction and in a second position releases said post for axial movement, and an actuator for moving said post axially, said actuator having a radially movable member for moving said element to said second position as said actuator is caused to engage said post.

13. In a chuck having a body equipped with a plurality of jaws mounted therein for sliding radial movement, each jaw having an inner member and a outer member, each jaw having identical means for controlling jaw movement, said means comprising: a post mounted in said body for reciprocal axial movement between an extended jaw engaging and holding position and a retracted jaw release position, and actuator means accessible through the side of the body for so moving said post, said outer member having an opening therein facing said inner member, one end of said post, when the post is in said extended position, being seated in said opening and having a close fit therewith, radially movable means, accessible through the side of the body, intersecting said post, having thereon an element which in a first position of said radially movable means engages said post and holds it against retraction, and in a second position releases said post for axial movement, and a tool for actuating said radially movable means, said tool having an arm with a release plunger thereon for moving said radially movable means to said second position as said tool is moved to a post engaging position.

14. In a chuck having a body equipped with a plurality of jaws mounted therein for sliding radial movement, a post supported in said body for axial movement behind each of said jaws, interengaging means on both the post and the jaw securing the jaw to the post against any radial movement relative to the post, radially movable locking means for securing said post against movement releasing said jaw, actuator means rotatable about a radial axis having a first element engaging said post for moving the post axially when said rotatable means is rotated, said actuator means also having a second element insertable radially into said chuck body for engaging and moving said radially movable locking means into a post release position, whereby when said second element has displaced said radially movable locking means to release said post for axial movement, rotation of said first element can retract said post to release said jaw for radial repositioning.

* * * * *